(12) United States Patent
Tang et al.

(10) Patent No.: US 10,790,537 B2
(45) Date of Patent: Sep. 29, 2020

(54) SECONDARY BATTERY AND PREPARATION METHOD THEREFOR

(71) Applicant: SHENZHEN INSTITUTES OF ADVANCED TECHNOLOGY CHINESE ACADEMY OF SCIENCES, Shenzhen, Guangdong (CN)

(72) Inventors: Yongbing Tang, Guangdong (CN); Xiaolong Zhang, Guangdong (CN); Fan Zhang, Guangdong (CN)

(73) Assignee: SHENZHEN INSTITUTES OF ADVANCED TECHNOLOGY CHINESE ACADEMY OF SCIENCES, Shenzhen (CN)

( * ) Notice: Subject to any disclaimer, the term of this patent is extended or adjusted under 35 U.S.C. 154(b) by 177 days.

(21) Appl. No.: 15/773,805

(22) PCT Filed: Nov. 12, 2016

(86) PCT No.: PCT/CN2016/105533
§ 371 (c)(1),
(2) Date: May 4, 2018

(87) PCT Pub. No.: WO2017/084538
PCT Pub. Date: May 26, 2017

(65) Prior Publication Data
US 2018/0323467 A1 Nov. 8, 2018

(30) Foreign Application Priority Data
Nov. 18, 2015 (CN) .......................... 2015 1 0796123

(51) Int. Cl.
*H01M 10/052* (2010.01)
*H01M 10/0525* (2010.01)
(Continued)

(52) U.S. Cl.
CPC ..... *H01M 10/0525* (2013.01); *H01M 2/0222* (2013.01); *H01M 2/145* (2013.01);
(Continued)

(58) Field of Classification Search
CPC .... H01M 4/1393; H01M 4/1397; H01M 4/38; H01M 4/58; H01M 1/0525; H01M 10/0525
See application file for complete search history.

(56) References Cited

U.S. PATENT DOCUMENTS 9,742,031 B2 * 8/2017 Lv ..................... H01M 10/0567
9,960,451 B1 * 5/2018 Zhamu ................ H01M 10/052
(Continued)

FOREIGN PATENT DOCUMENTS

CN    1505184 A    6/2004
CN    1755975 A    4/2006
(Continued)

OTHER PUBLICATIONS

Machine translation of CN203707250 (no date).*
(Continued)

*Primary Examiner* — Amanda C. Walke

(57) ABSTRACT

A secondary battery and its preparation method, the secondary battery having a negative electrode containing a negative current collector and no negative active material; an electrolyte having an electrolyte salt and an organic solvent; a separator; a positive electrode having a positive active material layer containing a positive active material, wherein the positive active material comprises a material having a layered crystal structure; and a battery case used for packaging. Main active component of the secondary battery is the positive active material having a layered crystal structure, which is environmentally-friendly and low in cost; meanwhile, negative active material is not needed by the second (Continued)

battery system, thereby remarkably reducing the weight and cost of the battery and improving the battery energy density. The reaction mechanism adopted by the secondary battery significantly increases the working voltage of the battery and further improves the energy density of the battery.

19 Claims, 2 Drawing Sheets

(51) Int. Cl.

| | | |
|---|---|---|
| *H01M 4/583* | (2010.01) | |
| *H01M 10/0567* | (2010.01) | |
| *H01M 10/058* | (2010.01) | |
| *H01M 4/66* | (2006.01) | |
| *H01M 4/48* | (2010.01) | |
| *H01M 4/58* | (2010.01) | |
| *H01M 4/38* | (2006.01) | |
| *H01M 2/02* | (2006.01) | |
| *H01M 2/14* | (2006.01) | |
| *H01M 2/16* | (2006.01) | |
| *H01M 4/1393* | (2010.01) | |
| *H01M 4/1397* | (2010.01) | |
| *H01M 10/04* | (2006.01) | |
| *H01M 10/0569* | (2010.01) | |
| *H01M 6/16* | (2006.01) | |
| *C01B 32/184* | (2017.01) | |
| *H01M 4/02* | (2006.01) | |

(52) U.S. Cl.
CPC ......... *H01M 2/162* (2013.01); *H01M 4/1393* (2013.01); *H01M 4/1397* (2013.01); *H01M 4/38* (2013.01); *H01M 4/48* (2013.01); *H01M 4/58* (2013.01); *H01M 4/583* (2013.01); *H01M 4/5815* (2013.01); *H01M 4/661* (2013.01); *H01M 10/0427* (2013.01); *H01M 10/052* (2013.01); *H01M 10/058* (2013.01); *H01M 10/0567* (2013.01); *H01M 10/0569* (2013.01); *C01B 32/184* (2017.08); *H01M 6/168* (2013.01); *H01M 2004/027* (2013.01); *H01M 2004/028* (2013.01)

(56) References Cited

U.S. PATENT DOCUMENTS

| | | | |
|---|---|---|---|
| 2003/0124434 A1* | 7/2003 | Gan | H01M 10/0525 429/326 |
| 2005/0238956 A1 | 10/2005 | Lee | |
| 2006/0073388 A1 | 4/2006 | Harada et al. | |
| 2012/0288754 A1* | 11/2012 | Matsushita | H01M 4/0421 429/188 |
| 2013/0260217 A1* | 10/2013 | Matsui | H01M 4/133 429/163 |
| 2013/0302700 A1* | 11/2013 | Washizuka | H01M 10/0525 429/331 |
| 2014/0045049 A1* | 2/2014 | Iyori | H01M 10/0567 429/179 |
| 2014/0079995 A1* | 3/2014 | Wakada | H01M 4/366 429/211 |
| 2014/0356734 A1* | 12/2014 | Ren | H01M 10/0567 429/338 |
| 2015/0044556 A1* | 2/2015 | Wang | H01M 4/366 429/213 |
| 2016/0240836 A1* | 8/2016 | Aotani | H01M 2/348 |
| 2017/0104204 A1* | 4/2017 | Zhamu | H01M 4/0416 |
| 2018/0034011 A1* | 2/2018 | Tsuda | H01M 10/44 |

FOREIGN PATENT DOCUMENTS

| | | |
|---|---|---|
| CN | 103730683 A | 4/2014 |
| CN | 203707250 U | 7/2014 |
| CN | 104078704 A | 10/2014 |
| CN | 105449186 A | 3/2016 |
| CN | 106340651 A | 1/2017 |
| JP | H09223496 A | 8/1997 |
| KR | 10-2006-0098787 A | 9/2006 |

OTHER PUBLICATIONS

International Search Report for International Application No. PCT/CN2016/105533 (2 Pages) (dated Feb. 15, 2017).
International Search Report for International Application No. PCT/CN2015/096887 (2 Pages) (dated Aug. 22, 2016).

* cited by examiner

SECONDARY BATTERY AND PREPARATION
METHOD THEREFOR

CROSS-REFERENCE TO RELATED APPLICATIONS

This application is a 371 U.S. of PCT/CN2016/105533 filed Nov. 12, 2016, which claims the priority of Chinese Patent Application No. 201510796123.5 filed Nov. 18, 2015, the contents of each of which are incorporated herein by reference.

TECHNICAL FIELD

The present disclosure relates to the technical field of secondary batteries, and particularly to a secondary battery which uses a material in a layered crystal structure as a positive active material and does not contain a negative active material, and a preparation method therefor.

BACKGROUND ART

A secondary battery, also called as a rechargeable battery, is a battery that can be repeatedly charged and discharged and is reusable. Compared with a non-reusable primary battery, the secondary battery has the advantages of low cost and little environmental pollution. At present, the main secondary battery technologies include lead-acid batteries, nickel-cadmium batteries, nickel-metal hydride batteries and lithium ion batteries. Particularly, lithium ion batteries are used most widely, and mobile phones, laptop computers, digital cameras, etc. which are used in daily life each use a lithium ion battery as the power supply. The core components of a lithium ion battery typically include a positive electrode (positive pole), a negative electrode (negative pole) and an electrolyte, and electric energy storage and release can be achieved in a lithium ion battery by an oxidation-reduction reaction taking place on the interfaces between the positive electrode and the electrolyte, and between the negative electrode and the electrolyte, in which reaction ion transport is separated from electron transport. Commercial lithium ion batteries mainly use transition metal oxides ($LiCoO_2$, $LiNiMnCoO_2$, $LiMn_2O_4$) or polyanionic metal compounds ($LiFePO_4$) as a positive active material, graphite or other carbon materials as a negative active material, and ester electrolyte or polymer gel as an electrolyte. At the time of charging, lithium ions are deintercalated from the positive active material and intercalated into the negative active material; and at the time of discharging, lithium ions are deintercalated from the negative active material and intercalated into the positive active material. For example, at the negative electrode: $6C+Li^++e^- \rightleftharpoons LiC_6$; and at the positive electrode: $LiCoO_2 \rightleftharpoons Li_{1-x}CoO_2+xLi^++xe^-$. However, the working voltage of a traditional lithium ion battery is about 3.7 V; and the theoretical capacity of the positive electrode material thereof is limited, so that the energy density of the battery is low, and can hardly be greatly improved; in addition, the positive active material contains transition metal elements, which, on the one hand, increases the preparation cost of the material, and on the other hand, increases the potential damage to the environment after the battery is abandoned.

Currently, novel secondary batteries that are environment-friendly and have high energy density are under active development in the industry. The research group of Professor DAI Hongjie from Stanford University in the United States has developed an aluminum ion battery (Nature, 2015, 520, 325). The battery uses three-dimensional porous graphite as the positive material, an aluminum foil as both the negative electrode and the current collector, and an aluminum salt-containing ionic liquid ($AlCl_3$/EMImCl) as the electrolyte. Similarly, the invention patent (application No. 201410419495.1) also discloses a rechargeable aluminum ion battery and a preparation method therefor, wherein the positive electrode of the battery is of a graphite structure carbon material, the negative electrode is of high-purity aluminum, and an aluminum salt-containing ionic liquid serves as the electrolyte. Different from lithium ion batteries, the working mechanism of aluminum ion batteries reported at present is the oxidation-reduction reaction of aluminum ions between the positive electrode and the negative electrode. At the time of charging, $Al_2Cl_7^-$ forms Al elementary substance and $AlCl_4^-$ at the negative electrode, and at the same time $AlCl_4^-$ moves to the positive electrode and is intercalated into graphite to form an intercalation compound $Cn(AlCl_4)$; and for discharging, the opposite is the case. The entire reaction process is: $4Al_2Cl_7^-+3e^- \rightleftharpoons Al+7AlCl_4^-$; $C_n+7AlCl_4^- \rightleftharpoons C_n(AlCl_4)+e^-$. Due to the difference in the reaction mechanism, such aluminum ion battery has the advantages such as fast charging and discharging, long cycle life and high safety, and so on. However, the working voltage of the battery is relatively low, which is only about 2.2 V, resulting in a relatively low energy density (only 40 Wh/kg). In addition, the ionic liquid is expensive, leaving the battery at a distance from the practical energy storage application.

Furthermore, the researchers have also developed a dual-carbon battery. The battery uses graphite-based carbon materials as the positive and negative active materials, and is completely free of transition metal elements. For example, Read, Xu et al. (Energy Environ. Sci. 2014, 7, 617) from the US Army Research Laboratory have developed a dual-graphite secondary battery that uses graphite material as both the negative and positive active materials, and fluorine modified esters as an electrolyte salt solvent, to achieve reversible charging and discharging of the battery system. Rothermel, Placke et al. (Energy Environ. Sci. 2014, 7, 3412) from the University of Munster in Germany have developed a dual-graphite battery based on an ionic liquid electrolyte salt, which also achieves reversible charging and discharging of the dual-graphite battery system. The reaction mechanism of the battery is that at the time of charging, the anions in the electrolyte are intercalated into the positive graphite material and meanwhile the lithium ions are intercalated into the negative graphite material; and at the time of discharging, the anions are deintercalated from the positive material and at the same time, the lithium ions are deintercalated from the negative material. For example, at the negative electrode: $6C+Li^++e^- \rightleftharpoons LiC_6$; and at the positive electrode: $C_n+PF_6^- \rightleftharpoons C_n(PF_6)+e^-$. Although the dual-graphite battery improves the influence of the battery on the environment, the preparation costs of the fluorine modified ester electrolyte and the ionic liquid electrolyte salt used in the dual-graphite battery are very high, resulting in a high preparation cost of the battery; moreover, the mass and the volume of the battery are increased significantly as both the positive and negative active materials use graphite, which reduces the energy density of the battery.

SUMMARY

An object of the present disclosure is to provide, for overcoming the defects in the prior art, a secondary battery which uses graphite or other materials in layered crystal structure as a positive active material and does not contain a negative active material, so as to overcome the defects in the prior secondary batteries, such as serious environmental pollution, high production cost, low energy density and low working voltage and the like.

In order to achieve the above object, the present disclosure provides a novel secondary battery, comprising: a negative electrode of the battery, an electrolyte, a separator, a positive electrode of the battery, and a battery case used for packaging, characterized in that the negative electrode of the battery comprises a negative current collector, and does not comprise a negative active material;

the electrolyte comprises an ester, sulfone, ether, nitrile or olefin organic additive; and the positive electrode of the battery comprises a positive active material layer that comprises a positive active material, wherein the positive active material comprises a graphitic material, a sulfide, a nitride, an oxide or a carbide having a layered crystal structure.

The present disclosure further provides a novel secondary battery, comprising: a negative electrode of the battery, an electrolyte, a separator, a positive electrode of the battery, and a battery case used for packaging, characterized in that the negative electrode of the battery comprises a negative current collector, and does not comprise a negative active material;

the electrolyte comprises an ester, sulfone, ether, nitrile or olefin organic additive; and the positive electrode of the battery comprises a positive active material layer that comprises a positive active material, wherein the positive active material is composed of a graphitic material, a sulfide, a nitride, an oxide or a carbide having a layered crystal structure.

The present disclosure provides a method for preparing the above secondary battery, which method comprises: preparing a negative electrode of the battery; preparing an electrolyte; preparing a separator; preparing a positive electrode of the battery; and performing assembly of the novel secondary battery using the negative electrode of the battery, the electrolyte, the separator and the positive electrode of the battery.

The main active component of the positive electrode of the secondary battery provided by the present disclosure is a material having a layered crystal structure, which is environment-friendly and low in cost. Moreover, in addition to the effect of conducting electricity as an electrode, the negative current collector in the novel secondary battery system of the present disclosure also serves as a material for reacting with the cations in the electrolyte, equivalent to serving as the negative active material of the secondary battery in the prior art. Thus, the secondary battery provided by an embodiment of the present disclosure does not need to further contain a negative active material, which thereby remarkably reduces the weight and the cost of the battery and improves the energy density of the battery. The reaction mechanism of the secondary battery provided by the present disclosure is: at the time of charging, the anions in the electrolyte are intercalated into the positive graphite layer and meanwhile the cations in the electrolyte move to the surface of the negative current collector to form an alloy, and for discharging, the opposite is the case. This reaction mechanism remarkably increases the working voltage (about 4.2 V) of the battery and further improves the energy density of the battery.

BRIEF DESCRIPTION OF DRAWINGS

The drawings described herein are used to provide further understanding of the present disclosure, which constitute a part of the present disclosure, rather than limiting the present disclosure. In the drawings.

DETAILED DESCRIPTION OF EMBODIMENTS

Below, the technical means adopted in the present disclosure in order to achieve the predetermined object of the present disclosure are further described with the preferred embodiments of the present disclosure with reference to the drawings.

Figure 1:
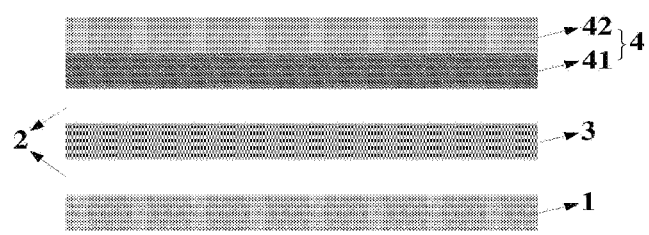
FIG. 1 is a schematic structural diagram of a novel secondary battery according to an embodiment of the present disclosure.

FIG. 1 is a schematic structural diagram of a novel secondary battery according to an embodiment of the present disclosure. As shown in FIG. 1, the novel secondary battery comprises: a negative electrode 1 of the battery, an electrolyte 2, a separator 3, a positive electrode 4 of the battery, and a battery case (not shown) used for packaging.

The negative electrode 1 of the battery comprises a negative current collector and does not contain a negative active material. The electrolyte comprises an ester, sulfone, ether, nitrile or olefin organic additive. The positive electrode 4 of the battery comprises a positive current collector 42 and a positive active material layer 41. The positive active material layer 41 comprises a positive active material, a conductive agent and a binder, wherein the positive active material comprises a graphitic material, a sulfide, a nitride, an oxide or a carbide, each having a layered crystal structure.

Figure 2:
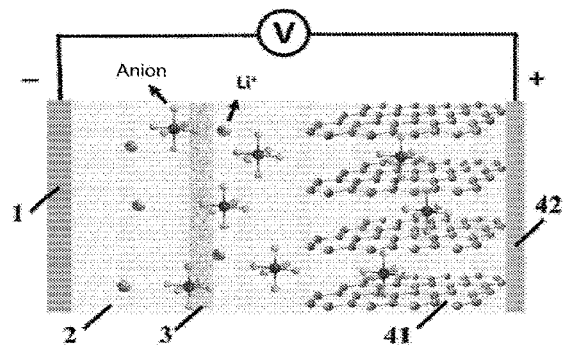
FIG. 2 is a schematic diagram of the working mechanism of a novel secondary battery according to an embodiment of the present disclosure, which uses graphite as a positive material and does not contain a negative material.
Figure 3:
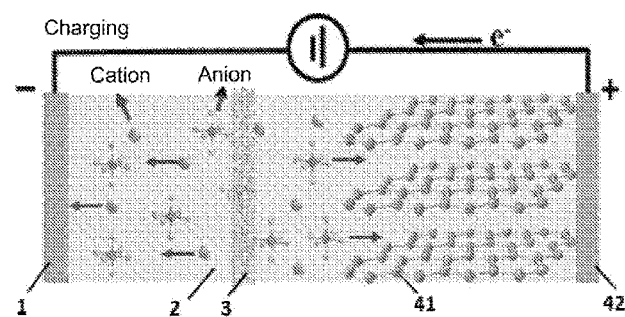
FIG. 3 is a schematic diagram of a novel secondary battery in a charging state, which battery uses graphite as a positive material and does not contain a negative material, according to an embodiment of the present disclosure.
Figure 4:
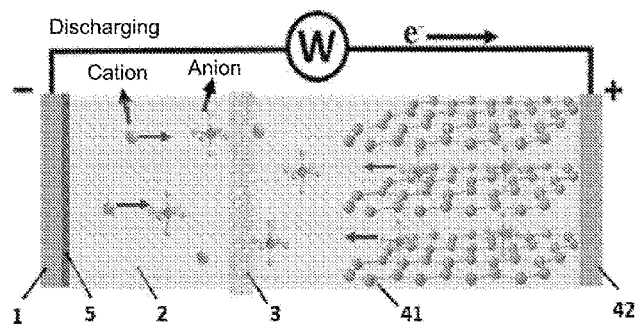
FIG. 4 is a schematic diagram of a novel secondary battery in a discharging state, which battery uses graphite as a positive material and does not contain a negative material, according to an embodiment of the present disclosure.

FIG. 2 is a schematic diagram of the working mechanism of a secondary battery according to an embodiment of the present disclosure, which uses graphite as a positive material and does not contain a negative material. Specifically, FIG. 3 is a schematic diagram of the battery in the state of charging, and FIG. 4 is a schematic diagram of the battery in the state of discharging. When the secondary battery of the embodiment of the present disclosure is charged, the cations in the electrolyte are intercalated into the negative current collector to form an alloy material 5 with the negative current collector; and at the same time, the anions in the electrolyte are intercalated into the positive active material having a layered crystal structure. When the secondary battery of the embodiment of the present disclosure is discharged, the cations are deintercalated from the alloy material 5 and return to the electrolyte, and at the same time, the anions intercalated into the positive active material are also deintercalated and return to the electrolyte.

In addition to the effect of conducting electricity as an electrode, the negative current collector in the secondary battery of the embodiment of the present disclosure also serves as a material for reacting with the cations in the electrolyte salt, equivalent to serving as the negative active material of the secondary battery in the prior art. Thus, the use of the battery structure containing no negative active material provided by the embodiment of the present disclosure can achieve a secondary battery that can be charged and discharged for multiple times.

Due to the novel reaction mechanism of the secondary battery of the embodiment of the present disclosure, a working voltage of about 4.2 V can be obtained, which remarkably improves the working voltage of the battery.

In an embodiment of the present disclosure, the negative current collector is of an electrically conductive material, which can conduct electricity and enables reversible intercalation or deintercalation of cations. For example, the negative current collector is of aluminum, copper, iron, tin, zinc, nickel, titanium or manganese, or its alloy.

Specifically, the negative current collector can either contain one substance or contain multiple substances, for example, can contain one or more of aluminum, copper, iron, tin, zinc, nickel, titanium and manganese as described above, or an alloy thereof, which is not limited in the present disclosure.

Preferably, the negative active material is aluminum.

In an embodiment of the present disclosure, the electrolyte comprises a solvent and an electrolyte salt.

In an embodiment of the present disclosure, the solvent in the electrolyte can enable the electrolyte salt to be dissociated into cations and anions, and the cations and the anions can freely migrate in the solvent. For example, the solvent is an ester, sulfone or ether organic solvent, and may be diethyl carbonate, dimethyl carbonate, ethyl methyl carbonate, dimethyl sulfone or dimethyl ether.

Specifically, the solvent may comprise one or more of an ester organic solvent, an sulfone organic solvent or an ether organic solvent, and for example, may comprise one or more of diethyl carbonate, dimethyl carbonate, ethyl methyl carbonate, dimethyl sulfone and dimethyl ether as described above, which is not limited in the present disclosure.

Preferably, the solvent is ethyl methyl carbonate.

The intercalation of the anions in the electrolyte into the positive active material having a layered crystal structure is within a certain limit, and the use of ethyl methyl carbonate as the solvent can ensure that the anions in the electrolyte are fully intercalated into the positive active material, thereby increasing the capacity of the secondary battery.

As can be known according to the energy density formula $E=CU$ (E represents the energy density of the battery, C represents the capacity of the battery, and U represents the working voltage of the battery), the increase of the capacity of the battery is beneficial to the increase of the energy density of the battery. Thus, the battery capacity of the secondary battery with ethyl methyl carbonate as the solvent is increased, further increasing the energy density of the battery.

In an embodiment of the present disclosure, the electrolyte salt in the electrolyte can be dissociated into cations and anions. For example, the electrolyte salt is a lithium salt, which may be lithium hexafluorophosphate, lithium tetrafluoroborate or lithium perchlorate, and has a concentration ranging from 0.1 to 10 mol/L.

Specifically, the electrolyte salt may comprise one or more of lithium hexafluorophosphate, lithium tetrafluoroborate and lithium perchlorate, which is not limited in the present disclosure.

Preferably, the electrolyte salt is lithium hexafluorophosphate; and the concentration of the electrolyte salt is 4 mol/L.

Further, the electrolyte further comprises an additive that can form a solid electrolyte interphase (SEI) film on the surface of the negative current collector.

By using an electrolyte containing an additive, the secondary battery of the embodiment of the present disclosure is capable of forming a stable solid electrolyte interphase (SEI) film on the surface of the negative current collector during the charging and discharging processes, so as to prevent the damages to the negative current collector due to a volume change during charging and discharging, so that the structure of the negative current collector is kept stable, the service life and the performance of the negative current collector are improved, and the cycling performance of the secondary battery is improved.

In an embodiment of the present disclosure, the additive in the electrolyte may promote the formation of a solid electrolyte interphase (SEI) film on the surface of the negative current collector. For example, the additive is an organic additive containing esters, sulfones, ethers, nitriles or olefins, and may be vinylene carbonate, glycol sulfite, propylene sulfite, ethylene sulfate, sulfolane, 1,3-dioxolane, acetonitrile or long-chain olefin, and the amount thereof is 0.1-20% wt.

Specifically, the additive may comprise one or more of an ester organic additive, a sulfone organic additive, an ether organic additive, a nitrile organic additive and an olefin organic additive, and for example, may comprise one or more of vinylene carbonate, glycol sulfite, propylene sulfite, ethylene sulfate, sulfolane, 1,3-dioxolane, acetonitrile and long-chain olefin as described above, which is not limited in the present disclosure.

Preferably, the additive is vinylene carbonate.

Preferably, the amount of added vinylene carbonate is 2% wt.

In an embodiment of the present disclosure, there is no special limit for the separator, which may be a separator commonly used in the art. For example, the component of the separator 3 is an insulated porous polymer film or an inorganic porous film, which may be a porous polypropylene film, a porous polyethylene film, a porous composite polymer film, glass fiber paper or a porous ceramic separator.

In an embodiment of the present disclosure, the positive current collector is of an electrically conductive material. For example, the positive current collector is of aluminum, copper, iron, tin, zinc, nickel, titanium or manganese, or its alloy.

Specifically, the positive current collector may either contain one substance or contain multiple substances, and for example, may contain one or more of aluminum, copper, iron, tin, zinc, nickel, titanium and manganese or an alloy thereof, which is not limited in the present disclosure.

In an embodiment of the present disclosure, the positive active material in the positive active material layer has a layered crystal structure, and enables reversible deintercalation or intercalation of anions. For example, the positive active material comprises a graphitic material, a sulfide, a nitride, an oxide or a carbide having a layered crystal structure, wherein the graphitic material may be natural graphite, artificial graphite or graphite flake;

the sulfide may be molybdenum disulfide, tungsten disulfide or vanadium disulfide;

the nitride may be hexagonal boron nitride or carbon-doped hexagonal boron nitride;

the oxide may be molybdenum trioxide, tungsten trioxide or vanadium pentoxide; and the carbide may be titanium carbide, tantalum carbide or molybdenum carbide.

Specifically, the positive active material may comprise one or more of a graphitic material, a sulfide, a nitride, an oxide and a carbide having a layered crystal structure, and may also comprise one or more of different types of graphitic materials or different types of sulfides, nitrides, oxides and carbides, which is not limited in the present disclosure.

Preferably, the positive active material is a graphitic material.

There is also no special limit on the conductive agent in the positive active material layer, which may be one commonly used in the art. For example, the conductive agent is one or more of conductive acetylene black, Super P conductive carbon spheres, conductive graphite KS6, carbon nanotubes and graphene.

Specifically, the conductive agent may only contain one substance or may contain multiple substances, for example, may comprise one or more of the various conductive agents commonly used in the art, which is not limited in the present disclosure.

There is also no special limit on the binder in the positive active material layer, which may be one commonly used in the art. For example, the binder is one or more of polyvinylidene fluoride, polytetrafluoroethylene, polyvinyl alcohol, carboxymethyl cellulose, SBR rubber and polyolefins.

Specifically, the binder may only contain one substance or may also contain multiple substances, for example, may comprise one or more of the various binders commonly used in the art, which is not limited in the present disclosure.

In an embodiment of the present disclosure, there is also no special limit on the ratio of the active material to the conductive agent and the binder in the positive active material layer 41, and a commonly used ratio in the art may be used. For example, the content of the positive active material is 60-90% wt, the content of the conductive agent is 30-5% wt, and the content of the binder is 10-5% wt.

According to the present disclosure, a button battery has been prepared, and has been demonstrated, by a battery system test, to be capable of realizing reversible charging and discharging. Moreover, the preparation process of the battery is remarkably simplified, the material cost may be reduced by 40%, the energy density may be improved to 1.3-2 times that of an existing commercial lithium ion battery, and the capacity attenuation of the battery is about 10% after 200 cycles, improving the cycling performance of the battery.

In an embodiment of the present disclosure, there is no special limit on the form of the secondary battery, and the forms commonly used in the art are applicable, for example, button batteries, square batteries, cylindrical batteries, soft-package batteries, etc.

In the second aspect, an embodiment of the present disclosure provides a method for preparing the secondary battery as provided in the embodiment of the present disclosure, which method comprises the steps of:

Step 1, preparing a negative electrode of the battery,
wherein the negative electrode of the battery comprises a negative current collector and does not contain a negative active material, and
specifically, the preparation process is cutting metal foils such as copper, iron, tin and aluminum foils into a desired size, and cleaning surfaces thereof for later use;

Step 2, preparing an electrolyte,
wherein a proper amount of electrolyte salt is weighed, added into a certain volume of solvent and fully stirred to be dissolved, and then a certain amount of electrolyte additive is added thereto, followed by even stirring for later use;

Step 3, preparing a separator,
wherein a porous polymer film or an inorganic porous film is cut into a desired size and cleaned for later use;

Step 4, preparing a positive electrode of the battery;
wherein the positive electrode of the battery is a graphite-based positive electrode, and comprises a positive active material layer and a positive current collector,
specifically, the preparation process comprises weighing an active material, a conductive agent and a binder at a certain ratio, and adding the same into a suitable solvent and fully grinding the same into an even slurry which is then evenly applied to the surface of the positive current collector, to form a positive active material layer on the surface of the positive current collector; and performing cutting after the slurry is completely dried, to obtain the battery positive electrode having a desired size, and
although the above Steps 1-4 describe the operations of the preparation method of the present disclosure in a specific order, it is not required or implied that these operations must be performed in this particular order. Rather, the preparations in Steps 1-4 can be carried out at the same time or in any order.

Step 5, performing assembly of a novel secondary battery using the negative electrode of the battery, the electrolyte, the separator and the positive electrode of the battery,
wherein the assembly of the battery is carried out in an inert gas or a water-free environment, wherein the prepared negative current collector, the separator and the positive electrode of the battery are sequentially and tightly stacked, the electrolyte is added thereto dropwise to completely wet the separator, and then the stacked part is packaged into a battery case, thereby finishing the assembly of the battery.

For the secondary battery and the preparation method for the secondary battery provided by the embodiments of the present disclosure, by optimizing the structure of the negative electrode of the battery and the type of the positive active material of the battery, a secondary battery is achieved, which battery is pollution-free and low in cost and has a significantly reduced weight and volume and an improved energy density; on this basis, further, an additive is added to the electrolyte of the battery, which improves the cycling performance of the secondary battery; and the selections for the negative current collector and the positive active material and for the type of the solvent, and the type and weight of the electrolyte additive are optimized, which improves the structure stability of the negative current collector, the working voltage of the battery and the battery capacity, which is achieved when a material in layered crystal structure is used as the positive electrode, and further increases the energy density of the secondary battery of the embodiments of the present disclosure.

In order to more clearly illustrate the novel secondary battery, description is made below with some specific embodiments. However, it should be noted that the following embodiments are only for better description of the present disclosure, without constituting an improper limit on the present disclosure.

Embodiment 1

The preparation of the negative electrode of the battery: an aluminum foil with a thickness of 0.3 mm was cut into a round sheet with a diameter of 12 mm, and the round sheet was washed with ethanol and aired for later use as a negative current collector.

The preparation of the separator: a piece of glass fiber paper was cut into a round sheet with a diameter of 16 mm, and the round sheet was washed with acetone and aired for later use as a separator.

The preparation of the electrolyte: 3 g of lithium hexafluorophosphate was weighed and added into 5 ml of ethyl methyl carbonate, the mixture was stirred until lithium hexafluorophosphate was completely dissolved to give an electrolyte with the lithium hexafluorophosphate concentration of 4 mol/L, then vinylene carbonate having a mass fraction of 2% was added thereto as an additive, and the resultant mixture was fully and evenly stirred for later use the electrolyte.

The preparation of the positive electrode of the battery: 0.8 g of natural graphite, 0.1 g of carbon black and 0.1 g of polyvinylidene fluoride were added into 2 ml of N-methylpyrrolidone solution, followed by fully grinding to obtain an even slurry; then the slurry was evenly applied onto the surface of the aluminum foil (i.e., the positive current collector), and dried in vacuum. The electrode plate resulting from drying was cut into a round sheet having a diameter of 10 mm, which was then compacted for later use as a positive electrode of the battery.

The assembly of the battery: in a glove box protected by an inert gas, the prepared negative current collector, separator and positive electrode of the battery were sequentially and tightly stacked, the electrolyte was added thereto dropwise to completely wet the separator, and then the stacked part was packaged into a button battery case, thereby finishing the assembly of the battery.

The reaction mechanism of the secondary battery in Embodiment 1 of the present disclosure is: at the negative electrode: $Al+Li^++e^- \rightleftharpoons AlLi$; and at the positive electrode: $C_n+PF_6^- \rightleftharpoons C_n(PF_6)+e^-$.

The electrochemical performance test of the battery: the secondary battery prepared in the embodiment of the preparation method of the secondary battery was charged at a current density of 100 mA/g until the voltage thereof reached 4.8 V, and then the battery was discharged at the same current density until the voltage thereof reached 3 V, the specific capacity and the energy density of the battery were measured, and the cycling stability (represented by the number of cycles, the number of cycles referring to the number of times of charging and discharging of the battery has experienced until the capacity of the battery is attenuated to 85%) was tested.

The electrochemical performance of the secondary battery provided in Embodiment 1 of the present disclosure was tested and compared with the performance of the traditional lithium ion battery, the aluminum ion battery and the dual-graphite battery mentioned in Background Art. The results and the comparison are shown in table 1.

TABLE 1

Table of parameters of electrochemical performances of the secondary battery in Embodiment 1 of the present disclosure and the secondary batteries in Background Art

| Type of the battery | Electrochemical performance | |
| --- | --- | --- |
| | Working voltage (V) | Energy density (Wh/kg) |
| Embodiment 1 of the present disclosure | 4.2 V | 222 |
| Traditional lithium ion battery in Background Art | 3.7 V | 150 |
| Aluminum ion battery in Background Art | 2.2 V | 40 |
| Dual-graphite battery in Background Art | 4.2 V | 108 |

As can be seen from Table 1, the secondary battery in Embodiment 1 of the present disclosure which uses a different reaction mechanism from the various batteries in Background Art has a higher working voltage and higher energy density.

Compared with the traditional lithium ion battery in Background Art, for the positive electrode of the secondary battery of Embodiment 1 of the present disclosure, the lithium-containing compound is replaced with graphite, which is environment-friendly and does not pollute the environment. In addition to the effect of conducting electricity as an electrode, the negative current collector in the secondary battery of Embodiment 1 of the present disclosure also serves as a material reacting with the cations in the electrolyte salt, thus, there is no need to further contain a negative active material, which thereby remarkably reduces the weight and the cost of the battery and improves the energy density of the battery. For the secondary battery of Embodiment 1 of the present disclosure, at the time of charging, the anions in the electrolyte are intercalated into the positive graphite layer and the cations in the electrolyte salt move to the surface of the negative current collector to form an alloy, and for discharging, the opposite is the case. The working voltage of the battery is about 4.2 V, therefore, the working voltage of the battery is increased and the energy density of the battery is improved.

Compared with the aluminum ion battery in Background Art, the secondary battery of Embodiment 1 of the present disclosure has a different electrolyte, and thereby has a different reaction mechanism and different performance. When the secondary battery of the present disclosure is charged, the anions in the electrolyte are intercalated into the positive graphite layer, and the cations in the electrolyte salt move to the surface of the negative current collector to form an alloy, and for discharging, the opposite is the case. The working voltage of the battery is about 4.2 V, therefore the working voltage of the battery is improved, and thereby the energy density of the battery is improved.

Compared with the dual-graphite battery in Background Art, in addition to the effect of conducting electricity as an electrode, the negative current collector in the secondary battery of Embodiment 1 of the present disclosure also serves as a material reacting with the cations in the electrolyte salt, thus, there is no need to further contain a negative active material, which remarkably reduces the self-weight and the cost of the battery and improves the energy density of the battery.

Embodiments 2-11

The secondary battery preparation processes in Embodiments 2-11 were the same as that in Embodiment 1 in terms of all the steps and the used materials except the material used in the preparation of the negative electrode of the battery. Moreover, the electrochemical performances of the secondary batteries in embodiments 2-11 were tested and compared with the performances of the battery in Embodiment 1 of the present disclosure. The negative materials used in Embodiments 2-11 and the electrochemical performances thereof are specifically shown in Table 2.

TABLE 2

Table of parameters of electrochemical performances of the secondary batteries in Embodiments 1-11 of the present disclosure

| Embodiment No. | Material of negative current collector | Specific capacity (mAh/g) | Number of cycles (cycle) | Energy density (Wh/kg) |
|---|---|---|---|---|
| 2 | Tin foil | 95 | 200 | 200 |
| 3 | Zinc foil | 95 | 300 | 100 |
| 4 | Copper foil | 33 | 200 | 70 |
| 5 | Iron foil | 50 | 250 | 106 |
| 6 | Nickel foil | 35 | 150 | 74 |
| 7 | Titanium foil | 30 | 200 | 64 |
| 8 | Manganese foil | 40 | 160 | 85 |
| 9 | Aluminum-tin alloy | 100 | 230 | 211 |
| 10 | Aluminum-titanium alloy | 90 | 300 | 190 |
| 11 | Iron-tin alloy | 80 | 180 | 170 |
| 1 | Aluminum foil | 104 | 300 | 222 |

As can be seen from Table 2, in the embodiments of the present disclosure, the negative current collector is preferably an aluminum foil, leading to a higher specific capacity, better cycling performance and higher energy density.

Embodiments 12-34

The secondary battery preparation processes in Embodiments 12-34 were the same as that in Embodiment 1 in terms of all the steps and the materials used except the positive active material used in the preparation of the positive electrode of the battery. Moreover, the electrochemical performances of the secondary batteries in Embodiments 12-34 were tested and compared with the performances of the battery in Embodiment 1 of the present disclosure. The positive active materials used in Embodiments 12-34 and the electrochemical performances thereof are specifically shown in Table 3.

TABLE 3

Table of parameters of electrochemical performances of the secondary batteries in Embodiments 12-34 of the present disclosure

| Embodiment No. | Positive active material | Specific capacity (mAh/g) | Number of cycles (cycle) | Energy density (Wh/kg) |
|---|---|---|---|---|
| 12 | Artificial graphite | 97 | 300 | 205 |
| 13 | Spherical graphite | 85 | 300 | 180 |
| 14 | Mesocarbon microbead | 93 | 300 | 197 |
| 15 | Mixture of natural graphite and artificial graphite (1:1) | 100 | 300 | 212 |
| 16 | Mixture of natural graphite and mesocarbon microbead (1:1) | 96 | 300 | 203 |
| 17 | Molybdenum disulfide | 35 | 200 | 74 |
| 18 | Tungsten disulfide | 30 | 220 | 63 |
| 19 | Vanadium disulfide | 33 | 190 | 70 |
| 20 | Titanium disulfide | 36 | 150 | 75 |
| 21 | Mixture of molybdenum disulfide and tungsten disulfide (1:1) | 30 | 200 | 63 |
| 22 | Hexagonal boron nitride | 60 | 260 | 127 |
| 23 | Carbon-doped hexagonal boron nitride | 70 | 300 | 148 |
| 24 | Mixture of hexagonal boron nitride and carbon-doped hexagonal boron nitride (1:1) | 65 | 280 | 138 |
| 25 | Molybdenum trioxide | 40 | 200 | 85 |
| 26 | Tungsten trioxide | 35 | 180 | 74 |
| 27 | Vanadium pentoxide | 50 | 200 | 106 |
| 28 | Titanium dioxide | 60 | 130 | 127 |
| 29 | Mixture of titanium dioxide and vanadium pentoxide (1:1) | 55 | 150 | 116 |
| 30 | Titanium carbide | 62 | 200 | 130 |
| 31 | Tantalum carbide | 30 | 230 | 63 |
| 32 | Molybdenum carbide | 45 | 210 | 95 |
| 33 | Silicon carbide | 30 | 200 | 63 |
| 34 | Mixture of titanium carbide and silicon carbide (1:1) | 48 | 200 | 102 |
| 1 | Natural graphite | 104 | 300 | 222 |

As can be seen from Table 3, in the embodiments of the present disclosure, the positive material is preferably a graphitic material, leading to a higher specific capacity and a higher energy density.

Embodiments 35-37

The secondary battery preparation processes in Embodiments 35-37 were the same as that in Embodiment 1 in terms of all the steps and the materials used except the electrolyte salt material used in the preparation of the electrolyte. Moreover, the electrochemical performances of the secondary batteries in Embodiments 35-37 were tested and compared with the performances of the battery in Embodiment 1 of the present disclosure. The electrolyte salt materials used in Embodiments 35-37 and the electrochemical performances thereof are specifically shown in Table 4.

TABLE 4

Table of parameters of electrochemical performances of the secondary batteries in Embodiments 35-37 of the present disclosure

| Embodiment No. | Electrolyte salt | Specific capacity (mAh/g) | Number of cycles (cycle) | Energy density (Wh/kg) |
|---|---|---|---|---|
| 35 | $LiBF_4$ | 96 | 280 | 203 |
| 36 | $LiClO_4$ | 98 | 250 | 207 |
| 37 | Mixture of $LiPF_6$ and $LiBF_4$ (1:1) | 100 | 280 | 210 |
| 1 | $LiPF_6$ | 104 | 300 | 222 |

As can be seen from Table 4, in the embodiments of the present disclosure, the electrolyte salt is preferably lithium hexafluorophosphate, leading to a higher specific capacity, better cycling stability and a higher energy density.

Embodiments 38-42

The secondary battery preparation processes in Embodiments 38-42 were the same as that in Embodiment 1 in terms of all the steps and the materials used except the concentration of the electrolyte salt used in the preparation of the electrolyte. Moreover, the electrochemical performances of the secondary batteries in Embodiments 38-42 were tested and compared with the performances of the battery in Embodiment 1 of the present disclosure. The concentrations of the electrolyte salts used in Embodiments 38-42 and the electrochemical performances thereof are specifically shown in Table 5.

TABLE 5

Table of parameters of electrochemical performances of the secondary batteries in Embodiments 38-42 of the present disclosure

| Embodiment No. | Electrolyte concentration | Electrochemical performance | | |
|---|---|---|---|---|
| | | Specific capacity (mAh/g) | Number of cycles (cycle) | Energy density (Wh/kg) |
| 38 | 0.1M | 10 | 300 | 20 |
| 39 | 0.5M | 47 | 300 | 100 |
| 40 | 1M | 60 | 300 | 128 |
| 41 | 2M | 70 | 300 | 150 |
| 42 | 10M | 55 | 300 | 117 |
| 1 | 4M | 104 | 300 | 222 |

As can be seen from Table 5, in the embodiments of the present disclosure, the concentration of the electrolyte salt is preferably 4 M, leading to a higher specific capacity, better cycling stability, and a higher energy density.

Embodiments 43-52

The secondary battery preparation processes in Embodiments 43-52 were the same as that in Embodiment 1 in terms of all the steps and the materials used except the solvent material used in the preparation of the electrolyte. Moreover, the electrochemical performances of the secondary batteries in Embodiments 43-52 were tested and compared with the performances of the battery in Embodiment 1 of the present disclosure. The solvent materials used in Embodiments 43-52 and the electrochemical performances thereof are specifically shown in Table 6.

TABLE 6

Table of parameters of electrochemical performances of the secondary batteries in Embodiments 43-52 of the present disclosure

| Embodiment No. | Solvent material | Electrochemical performance | | |
|---|---|---|---|---|
| | | Specific capacity (mAh/g) | Number of cycles (cycle) | Energy density (Wh/kg) |
| 43 | Dimethyl carbonate | 95 | 300 | 203 |
| 44 | Diethyl carbonate | 93 | 300 | 200 |
| 45 | Propylene carbonate | 90 | 300 | 192 |
| 46 | Ethylene carbonate:ethyl methyl carbonate = 1:1 | 100 | 300 | 213 |
| 47 | Ethylene carbonate:ethyl methyl carbonate:dimethyl carbonate = 1:1:1 | 98 | 300 | 209 |
| 48 | Dimethyl sulfone | 30 | 300 | 63 |
| 49 | Sulfolane | 35 | 300 | 74 |
| 50 | Dimethyl ether | 70 | 300 | 150 |
| 51 | Glycol dimethyl ether | 60 | 300 | 128 |
| 52 | Ethyl methyl carbonate:sulfolane = 4:1 | 100 | 300 | 213 |
| 1 | Ethyl methyl carbonate | 104 | 300 | 222 |

As can be seen from Table 6, in the embodiments of the present disclosure, the solvent is preferably ethyl methyl carbonate, leading to a higher specific capacity and a higher energy density.

Embodiments 53-60

The secondary battery preparation processes in Embodiments 53-60 were the same as that in Embodiment 1 in terms of all the steps and the materials used except the type of the additive used in the preparation of the electrolyte. Moreover, the electrochemical performances of the secondary batteries in Embodiments 53-60 were tested and compared with the performances of the battery in Embodiment 1 of the present disclosure. The types of the additives used in Embodiments 53-60 and the electrochemical performances thereof are specifically shown in Table 7.

TABLE 7

Table of parameters of electrochemical performances of the secondary batteries in Embodiments 53-60 of the present disclosure

| Embodiment No. | Additive type | Electrochemical performance | |
|---|---|---|---|
| | | Number of cycles (cycle) | Energy density (Wh/kg) |
| 53 | Glycol sulfite | 250 | 222 |
| 54 | Propylene sulfite | 260 | 222 |
| 55 | Ethylene sulfate | 220 | 222 |
| 56 | 1,3-Dioxolane | 200 | 222 |
| 57 | Acetonitrile | 250 | 222 |
| 58 | Long-chain olefin | 180 | 222 |
| 59 | Fluoroethylene carbonate | 200 | 222 |
| 60 | Vinylene carbonate:glycol sulfite = 1:1 | 250 | 222 |
| 1 | Vinylene carbonate | 300 | 222 |

As can be seen from Table 7, in the embodiments of the present disclosure, the additive is preferably vinylene carbonate, leading to a better cycling stability.

Embodiments 61-67

The secondary battery preparation processes in Embodiments 61-67 were the same as that in Embodiment 1 in terms of all the steps and the materials used except the concentration of the additive used in the preparation of the electrolyte. Moreover, the electrochemical performances of the secondary batteries in Embodiments 61-67 were tested and compared with the performances of the battery in Embodiment 1 of the present disclosure. The concentrations of the additives used in Embodiments 61-67 and the electrochemical performances thereof are specifically shown in Table 8.

TABLE 8

Table of parameters of electrochemical performances of the secondary batteries in Embodiments 61-67 of the present disclosure

| Embodiment No. | Additive mass fraction | Electrochemical performance | |
|---|---|---|---|
| | | Number of cycles (cycle) | Energy density (Wh/kg) |
| 61 | 0.1 wt % | 50 | 222 |
| 62 | 1 wt % | 200 | 222 |
| 63 | 3 wt % | 250 | 222 |
| 64 | 5 wt % | 150 | 222 |
| 65 | 10 wt % | 150 | 222 |
| 66 | 20 wt % | 120 | 222 |
| 67 | 40 wt % | 100 | 222 |
| 1 | 2 wt % | 300 | 222 |

As can be seen from Table 8, in the embodiments of the present disclosure, the mass fraction of the additive is preferably 2 wt %, leading to better cycling stability.

Embodiments 68-71

The secondary battery preparation processes in Embodiments 68-71 were the same as that in Embodiment 1 in terms of all the steps and the materials used except the separator material used in the preparation of the separator. Moreover, the electrochemical performances of the secondary batteries in Embodiments 68-71 were tested and compared with the performances of the battery in Embodiment 1 of the present disclosure. The separator materials used in Embodiments 68-71 and the electrochemical performances thereof are specifically shown in Table 9.

TABLE 9

Table of parameters of electrochemical performances of the secondary batteries in Embodiments 68-71 of the present disclosure

| Embodiment No. | Separator material | Electrochemical performance | |
| --- | --- | --- | --- |
| | | Number of cycles (cycle) | Energy density (Wh/kg) |
| 68 | Porous ceramic separator | 300 | 222 |
| 69 | Porous polypropylene film | 300 | 222 |
| 70 | Porous polyethylene film | 300 | 222 |
| 71 | Porous composite polymer film | 300 | 222 |
| 1 | Glass fiber paper | 300 | 222 |

As can be seen from Table 9, the selection of different separator materials has no significant impact on the number of cycles and the energy density of the secondary battery.

Embodiments 72-78

The secondary battery preparation processes in Embodiments 72-78 were the same as that in Embodiment 1 in terms of all the steps and the materials used except the types and the mass fractions of the conductive agent and the binder used in the preparation of the positive electrode of the battery. Moreover, the electrochemical performances of the secondary batteries in Embodiments 72-78 were tested and compared with the performance of the battery in Embodiment 1 of the present disclosure. The types and the mass fractions of the conductive agents and the binders used in Embodiments 72-78 are specifically shown in Table 10.

TABLE 10

Table of parameters of electrochemical performances of the secondary batteries in Embodiments 72-78 of the present disclosure

| Embodiment No. | Conductive agent | Binder | Electrochemical performance | |
| --- | --- | --- | --- | --- |
| | | | Number of cycles (cycle) | Energy density (Wh/kg) |
| 72 | Acetylene black (10%) | Polyvinylidene fluoride (10%) | 300 | 222 |
| 73 | Conductive carbon sphere (5%) | Polytetrafluoroethylene (10%) | 300 | 222 |
| 74 | Conductive graphite (30%) | Polyvinyl alcohol (5%) | 300 | 222 |
| 75 | Carbon nanotube (10%) | Polypropylene (5%) | 300 | 222 |
| 76 | Graphene (5%) | Carboxymethyl cellulose + SBR (10%) | 300 | 222 |
| 77 | Conductive carbon fiber (8%) | Polyvinylidene fluoride (12%) | 300 | 222 |
| 78 | Acetylene black + carbon nanotube (5%) | Polyvinylidene fluoride (20%) | 300 | 222 |
| 1 | Conductive carbon black (10%) | Polyvinylidene fluoride (10%) | 300 | 222 |

As can be seen from Table 10, the selection of different types and mass fractions of the conductive agent and the binder has no significant impact on the number of cycles and the energy density of the secondary battery.

Embodiment 79

The preparation of the negative electrode of the battery: a copper foil with a thickness of 0.5 mm was cut into a round sheet with a diameter of 12 mm, and the copper sheet was washed with ethanol and aired for later use as the negative current collector.

The preparation of the separator: a Celgard 2400 porous polymer film was cut into a round sheet with a diameter of 16 mm, and the round sheet was washed with acetone and aired for later use as a separator.

The preparation of the electrolyte: 3 g of lithium hexafluorophosphate was weighed and added into 5 ml of ethyl methyl carbonate, the mixture was stirred until lithium hexafluorophosphate was completely dissolved, then vinylene carbonate having a mass fraction of 2% was added thereto as an additive, and the resultant mixture was fully and evenly stirred for later use an electrolyte.

The preparation of the positive electrode of the battery: 0.8 g of artificial graphite, 0.1 g of carbon black and 0.1 g of polyvinylidene fluoride were added into 2 ml of N-methylpyrrolidone solution, followed by fully grinding to obtain an even slurry; and then the slurry was evenly applied onto the surface of the aluminum foil (i.e., the positive current collector), and dried in vacuum. The electrode plate resulting from drying was cut into a round sheet having a diameter of 10 mm which was then compacted for later use as the positive electrode of the battery.

The assembly of the battery: in a glove box protected by an inert gas, the prepared negative current collector, separator and positive electrode of the battery were sequentially and tightly stacked, the electrolyte was added thereto dropwise to completely wet the separator, and then the stacked part was packaged into a button battery case, thereby finishing the assembly of the battery.

Embodiment 80

The preparation of the negative electrode of the battery: an aluminum foil with a thickness of 0.3 mm was cut into a round sheet with a diameter of 12 mm, and the round sheet was washed with ethanol and aired for later use as the negative current collector.

The preparation of the separator: a piece of glass fiber paper was cut into a round sheet with a diameter of 16 mm, and the round sheet was washed with acetone and aired for later use as the separator.

The preparation of the electrolyte: 3 g of lithium hexafluorophosphate was weighed and added into 5 ml of ethyl methyl carbonate, the mixture was stirred until lithium hexafluorophosphate is completely dissolved, then glycol sulfite having a mass fraction of 3% was added thereto as an additive, and the resultant mixture was fully and evenly stirred for later use an electrolyte.

The preparation of the positive electrode of the battery: 0.7 g of artificial graphite, 0.2 g of carbon black and 0.1 g of polyvinylidene fluoride were added into 2 ml of N-methylpyrrolidone solution, followed by fully grinding to obtain an even slurry; and then the slurry was evenly applied onto the surface of the aluminum foil, and dried in vacuum. The electrode plate resulting from drying was cut into a round sheet having a diameter of 10 mm which was then compacted for later use as a positive electrode of the battery.

The assembly of the battery: in a glove box protected by an inert gas, the prepared negative current collector, separator and positive electrode of the battery were sequentially and tightly stacked, the electrolyte was added thereto dropwise to completely wet the separator, and then the stacked part was packaged into a button battery case, thereby finishing the assembly of the battery.

Embodiment 81

The preparation of the negative electrode of the battery: an aluminum foil with a thickness of 0.3 mm was cut into a round sheet with a diameter of 12 mm, and the round sheet was washed with ethanol and aired for later use as the negative current collector.

The preparation of the separator: a piece of glass fiber paper was cut into a round sheet with a diameter of 16 mm, and the round sheet is washed with acetone and aired for later use as the separator.

The preparation of the electrolyte: 2 g of lithium tetrafluoroborate was weighed and added into 5 ml of ethyl methyl carbonate, the mixture was stirred until lithium tetrafluoroborate was completely dissolved, then vinylene carbonate having a mass fraction of 3% was added thereto as an additive, and the resultant mixture was fully and evenly stirred for later use the electrolyte.

The preparation of the positive electrode of the battery: 0.8 g of artificial graphite, 0.15 g of carbon black and 0.05 g of polyvinylidene fluoride were added into 2 ml of N-methylpyrrolidone solution, followed by fully grinding to obtain an even slurry; and then the slurry was evenly applied onto the surface of the aluminum foil, and dried in vacuum. The electrode plate resulting from drying was cut into a round sheet having a diameter of 10 mm which was then compacted for later use as a positive electrode of the battery.

The assembly of the battery: in a glove box protected by an inert gas, the prepared negative current collector, separator and positive electrode of the battery were sequentially and tightly stacked, the electrolyte was added thereto dropwise to completely wet the separator, and then the stacked part was packaged into a button battery case, thereby finishing the assembly of the battery.

Embodiment 82

The preparation of the negative electrode of the battery: an iron sheet with a thickness of 0.3 mm was cut into a round sheet with a diameter of 12 mm, and the round sheet was washed with ethanol and aired for later use as the negative current collector.

The preparation of the separator: a piece of glass fiber paper was cut into a round sheet with a diameter of 16 mm, and the round sheet was washed with acetone and aired for later use as the separator.

The preparation of the electrolyte: 3 g of lithium hexafluorophosphate was weighed and added into 5 ml of ethyl methyl carbonate, the mixture was stirred until lithium hexafluorophosphate was completely dissolved, then ethylene sulfate having a mass fraction of 2% was added thereto as an additive, and the resultant mixture was fully and evenly stirred for later use the electrolyte.

The preparation of the positive electrode of the battery: 1 g of titanium carbide, 0.15 g of carbon black and 0.05 g of polyvinylidene fluoride were added into 2 ml of N-methylpyrrolidone solution, followed by fully grinding to obtain an even slurry; and then the slurry was evenly applied onto the surface of the aluminum foil, and dried in vacuum. The electrode plate resulting from drying was cut into a round sheet having a diameter of 10 mm which was then compacted for later use as the positive electrode of the battery.

The assembly of the battery: in a glove box protected by an inert gas, the prepared negative current collector, separator and positive electrode of the battery were sequentially and tightly stacked, the electrolyte as added thereto dropwise to completely wet the separator, and then the stacked part was packaged into a button battery case, thereby finishing the assembly of the battery.

Embodiment 83

The preparation of the negative electrode of the battery: a copper foil with a thickness of 0.3 mm was cut into a round sheet with a diameter of 12 mm, and the copper sheet is washed with ethanol and aired for later use as the negative current collector.

The preparation of the separator: a porous polypropylene film was cut into a round sheet with a diameter of 16 mm, and the round sheet was washed with acetone and aired for later use as the separator.

The preparation of the electrolyte: 3 g of lithium hexafluorophosphate was weighed and added into 5 ml of ethyl methyl carbonate, the mixture was stirred until lithium hexafluorophosphate was completely dissolved, then sulfolane having a mass fraction of 2% was added thereto as an additive, and the resultant mixture was fully and evenly stirred for later use an electrolyte.

The preparation of the positive electrode of the battery: 1 g of titanium carbide, 0.15 g of carbon black and 0.05 g of polyvinylidene fluoride were added into 2 ml of N-methylpyrrolidone solution, followed by fully grinding to obtain an even slurry; and then the slurry was evenly applied onto the surface of the aluminum foil, and dried in vacuum. The electrode plate resulting from drying was cut into a round sheet having a diameter of 10 mm which was then compacted for later use as a positive electrode of the battery.

The assembly of the battery: in a glove box protected by an inert gas, the prepared negative current collector, separator and positive electrode of the battery were sequentially and tightly stacked, the electrolyte was added thereto dropwise to completely wet the separator, and then the stacked part was packaged into a button battery case, thereby finishing the assembly of the battery.

Embodiment 84

The preparation of the negative electrode of the battery: an aluminum foil with a thickness of 0.3 mm was cut into a round sheet with a diameter of 12 mm, and the round sheet was washed with ethanol and aired for later use as a negative current collector.

The preparation of the separator: a porous polypropylene film was cut into a round sheet with a diameter of 16 mm, and the round sheet was washed with acetone and aired for later use as the separator.

The preparation of the electrolyte: 3 g of lithium perchlorate was weighed and added into 5 ml of ethyl methyl carbonate, the mixture was stirred until lithium perchlorate was completely dissolved, then glycol sulfite having a mass fraction of 2% was added thereto as an additive, and the resultant mixture was fully and evenly stirred for later use the electrolyte.

The preparation of the positive electrode of the battery: 1 g of molybdenum disulfide, 0.15 g of carbon black and 0.05 g of polyvinylidene fluoride were added into 2 ml of N-methylpyrrolidone solution, followed by fully grinding to obtain an even slurry; and then the slurry was evenly applied onto the surface of the aluminum foil, and dried in vacuum. The electrode plate resulting from drying was cut into a round sheet having a diameter of 10 mm which was then compacted for later use as a positive electrode of the battery.

An electrochemical performance test was conducted on the secondary batteries in Embodiments 79-84, and the results are shown in Table 11:

TABLE 11

Table of parameters of electrochemical performances of the secondary batteries in Embodiments 79-84 of the present disclosure

| Embodiment No. | Electrochemical performance | | |
|---|---|---|---|
| | Specific capacity (mAh/g) | Number of cycles (cycle) | Energy density (Wh/kg) |
| 79 | 33 | 200 | 70 |
| 80 | 104 | 175 | 222 |
| 81 | 96 | 160 | 203 |
| 82 | 50 | 180 | 106 |
| 83 | 33 | 160 | 70 |
| 84 | 98 | 170 | 207 |

Embodiments 80, 81 and 84 in which an aluminum foil was used as the negative material achieved higher specific capacities and higher energy densities than Embodiments 79, 82 and 83 in which other materials were used as the negative material.

Embodiment 79 in which vinylene carbonate with a mass fraction of 2% was used as an additive achieved better cycling stability than Embodiments 80-84 in which other additives were used.

Embodiment 80 in which 4M lithium hexafluorophosphate was used as the electrolyte salt achieved a higher specific capacity and a greater energy density than Embodiments 81 and 84 in which other materials were used as the electrolyte salt.

The form of the secondary batteries involved in the present disclosure is not limited to a button battery, instead, other forms such as square batteries, cylindrical batteries and soft-package batteries may also be designed according to the core components.

The main active component of the secondary battery provided by the present disclosure is a graphitic material having a layered crystal structure, which is environment-friendly and low in cost. Moreover, no negative active material is needed in the secondary battery system of the present disclosure, which thereby remarkably reduces the self-weight and the cost of the battery and improves the energy density of the battery. The reaction mechanism used in the secondary battery provided by the present disclosure can achieve a working voltage of about 4.2 V, therefore, the working voltage of the battery is high, and the energy density of the battery can be greatly improved.

In the above specific embodiments, the objects, the technical solutions and the advantageous effects of the present disclosure are described in further detail. However, it should be understood that the descriptions above are only specific embodiments of the present disclosure, and are not intended to limit the scope of protection of the present disclosure. Any modifications, equivalent substitutions, improvements etc. made within the spirit and mechanism of the present disclosure shall all fall within the scope of protection of the present disclosure.

The invention claimed is:

1. A secondary battery, comprising: a negative electrode of the battery, an electrolyte, a separator, a positive electrode of the battery, and a battery case configured for packaging, wherein the negative electrode of the battery comprises a negative current collector, and does not comprise a negative active material;
the electrolyte comprises an ester, sulfone, ether, nitrile or olefin organic additive; and
the positive electrode of the battery comprises a positive active material layer, with the positive active material layer comprising a positive active material, wherein the positive active material comprises a graphitic material, a sulfide, a nitride, an oxide or a carbide having a layered crystal structure;
wherein the positive active material is composed of a graphitic material, a sulfide, a nitride, an oxide or a carbide having a layered crystal structure.

2. The secondary battery according to claim 1, wherein the negative current collector is of an electrically conductive material which is aluminum, copper, iron, tin, zinc, nickel, titanium or manganese, or its alloy.

3. The secondary battery according to claim 2, wherein the negative current collector is of aluminum.

4. The secondary battery according to claim 1, wherein components of the electrolyte further comprise a solvent and an electrolyte salt, wherein the solvent is an ester, sulfone or ether organic solvent, and the electrolyte salt is a lithium salt.

5. The secondary battery according to claim 4, wherein the electrolyte salt is selected from the group consisting of lithium hexafluorophosphate, lithium tetrafluoroborate and lithium perchlorate, and has a concentration ranging from 0.1 to 10 mol/L.

6. The secondary battery according to claim 4, wherein the solvent is selected from the group consisting of diethyl carbonate, dimethyl carbonate, ethyl methyl carbonate, dimethyl sulfone and dimethyl ether.

7. The secondary battery according to claim 6, wherein the solvent is ethyl methyl carbonate.

8. The secondary battery according to claim 1, wherein the ester, sulfone, ether, nitrile or olefin organic additive is selected from the group consisting of vinylene carbonate, glycol sulfite, propylene sulfite, ethylene sulfate, sulfolane, 1,3-dioxolane, acetonitrile and long-chain olefin, and an amount of the added organic additive is 0.1-20% wt.

9. The secondary battery according to claim 8, wherein the organic additive is vinylene carbonate, and an amount of the added organic additive is 2% wt.

10. The secondary battery according to claim 1, wherein the graphitic material in the positive active material is selected from the group consisting of natural graphite, artificial graphite and graphite flake;
the sulfide is selected from the group consisting of molybdenum disulfide, tungsten disulfide and vanadium disulfide;
the nitride is selected from the group consisting of hexagonal boron nitride and carbon-doped hexagonal boron nitride;
the oxide is selected from the group consisting of molybdenum trioxide, tungsten trioxide and vanadium pentoxide; and
the carbide is selected from the group consisting of titanium carbide, tantalum carbide and molybdenum carbide.

11. A method for preparing a novel secondary battery, comprising:
preparing a negative electrode of the battery;
preparing an electrolyte;
preparing a separator;
preparing a positive electrode of the battery;
performing assembly of the novel secondary battery using the negative electrode of the battery, the electrolyte, the separator and the positive electrode of the battery; and
the secondary battery comprises a negative electrode of the battery, an electrolyte, a separator, a positive electrode of the battery, and a battery case configured for packaging,
wherein the negative electrode of the battery comprises a negative current collector, and does not comprise a negative active material;
the electrolyte comprises an ester, sulfone, ether, nitrile or olefin organic additive; and
the positive electrode of the battery comprises a positive active material layer, with the positive active material layer comprising a positive active material, wherein the positive active material comprises a graphitic material, a sulfide, a nitride, an oxide or a carbide having a layered crystal structure.

12. The method for preparing a novel secondary battery according to claim 11, wherein the negative current collector is of an electrically conductive material which is aluminum, copper, iron, tin, zinc, nickel, titanium or manganese, or its alloy.

13. The method for preparing a novel secondary battery according to claim 11, wherein components of the electrolyte further comprise a solvent and an electrolyte salt, wherein the solvent is an ester, sulfone or ether organic solvent, and the electrolyte salt is a lithium salt.

14. The method for preparing a novel secondary battery according to claim 13, wherein the electrolyte salt is selected from the group consisting of lithium hexafluorophosphate, lithium tetrafluoroborate and lithium perchlorate, and has a concentration ranging from 0.1 to 10 mol/L.

15. The method for preparing a novel secondary battery according to claim 13, wherein the solvent is selected from the group consisting of diethyl carbonate, dimethyl carbonate, ethyl methyl carbonate, dimethyl sulfone and dimethyl ether.

16. The method for preparing a novel secondary battery according to claim 15, wherein the solvent is ethyl methyl carbonate.

17. The method for preparing a novel secondary battery according to claim 11, wherein the ester, sulfone, ether, nitrile or olefin organic additive is selected from the group consisting of vinylene carbonate, glycol sulfite, propylene sulfite, ethylene sulfate, sulfolane, 1,3-dioxolane, acetonitrile and long-chain olefin, and an amount of the added organic additive is 0.1-20% wt.

18. The method for preparing a novel secondary battery according to claim 17, wherein the organic additive is vinylene carbonate, and an amount of the added organic additive is 2% wt.

19. The method for preparing a novel secondary battery according to claim 11, wherein the graphitic material in the positive active material is selected from the group consisting of natural graphite, artificial graphite and graphite flake;
the sulfide is selected from the group consisting of molybdenum disulfide, tungsten disulfide and vanadium disulfide;
the nitride is selected from the group consisting of hexagonal boron nitride and carbon-doped hexagonal boron nitride;
the oxide is selected from the group consisting of molybdenum trioxide, tungsten trioxide and vanadium pentoxide; and
the carbide is selected from the group consisting of titanium carbide, tantalum carbide and molybdenum carbide.

* * * * *